United States Patent [19]

Bhanu et al.

[11] Patent Number: 5,128,874
[45] Date of Patent: Jul. 7, 1992

[54] INERTIAL NAVIGATION SENSOR INTEGRATED OBSTACLE DETECTION SYSTEM

[75] Inventors: Bir Bhanu, New Brighton; Barry A. Roberts, Little Canada, both of Minn.

[73] Assignee: Honeywell Inc., Minneapolis, Minn.

[21] Appl. No.: 459,930

[22] Filed: Jan. 2, 1990

[51] Int. Cl.$^5$ ............................................. G06F 15/50
[52] U.S. Cl. ................................... 364/461; 364/453; 358/103; 342/55
[58] Field of Search ............... 364/449, 453, 454, 458, 364/460, 461, 518; 342/54, 55, 65, 66; 358/103

[56] References Cited

U.S. PATENT DOCUMENTS

| | | | |
|---|---|---|---|
| 3,404,398 | 10/1968 | Hoben et al. | 342/65 |
| 3,421,716 | 1/1969 | Altekruse et al. | 244/3.17 |
| 3,713,147 | 1/1973 | Chanzit et al. | 342/65 |
| 4,264,907 | 4/1981 | Dorand, Jr. et al. | 244/3.15 |
| 4,495,580 | 1/1985 | Keearns | 364/454 |
| 4,497,065 | 1/1985 | Tisdale et al. | 382/1 |
| 4,635,203 | 1/1987 | Merchant | 364/458 |
| 4,695,959 | 9/1987 | Lees et al. | 364/458 |
| 4,700,307 | 10/1987 | Mons et al. | 364/453 |
| 4,872,051 | 10/1989 | Dye | 358/103 |
| 4,926,346 | 5/1990 | Yokoyama | 364/518 |
| 4,931,937 | 6/1990 | Kakinami et al. | 364/460 |
| 4,954,837 | 9/1990 | Baird et al. | 364/458 |

FOREIGN PATENT DOCUMENTS 2115633 9/1983 United Kingdom .

Primary Examiner—Gary Chin
Attorney, Agent, or Firm—John G. Shudy, Jr.

[57] ABSTRACT

A system that incorporates inertial sensor information into optical flow computations to detect obstacles and to provide alternative navigational paths free from obstacles. The system is a maximally passive obstacle detection system that makes selective use of an active sensor. The active detection typically utilizes a laser. Passive sensor suite includes binocular stereo, motion stereo and variable fields-of-view. Optical flow computations involve extraction, derotation and matching of interest points from sequential frames of imagery, for range interpolation of the sensed scene, which in turn provides obstacle information for purposes of safe navigation.

4 Claims, 16 Drawing Sheets

| SENSOR TYPE | FIELD OF VIEW | ARRAY SIZE (PIXELS) | INSTANTANEOUS FOV (mrads) | RESOLUTION (cm AT 40m) |
|---|---|---|---|---|
| MOTION STEREO | 120°x60° | 512x256 | 4.09 | 16.36 |
| BINOCULAR STEREO | 40°x20° | 512x256 | 1.36 | 5.45 |
| MULTI-PURPOSE | 25°x25° WIDE | 512x512 | 0.852 | 3.41 |
|  | 0.72°x0.72° NARROW | 512x512 | 0.025 | 0.1 |
| LASER RANGE | CENTRAL ANGLE = 20° | CIRCULAR SCAN | 0.5 | 2.0 |

Fig. 13

|  | x (ft) | y (ft) | z (ft) |
|---|---|---|---|
| 1 | 100 | 25 | 4 |
| 2 | 95 | -30 | 4 |
| 3 | 90 | -10 | 4 |
| 4 | 85 | -5 | 4 |
| 5 | 80 | 2 | 4 |
| 6 | 75 | 8 | 4 |
| 7 | 70 | -8 | 4 |
| 8 | 65 | 10 | 4 |
| 9 | 60 | 0 | 4 |
| 10 | 55 | 5 | 4 |
| 11 | 50 | -15 | 4 |
| 12 | 35 | 10 | 4 |
| 13 | 30 | 3 | 4 |
| 14 | 25 | -5 | 4 |
| 15 | 20 | 2 | 4 |

Fig. 14

|  | x (ft) | y (ft) | z (ft) | ROLL (deg) | PITCH (deg) | YAW (deg) |
|---|---|---|---|---|---|---|
| FRAME A | 0 | 0 | -7 | 0 | -15 | 0 |
| FRAME B | 5 | 1 | -6 | 5 | -11 | 2 |

Fig. 15

|  | x (ft) | y (ft) | z (ft) | ROLL (deg) | PITCH (deg) | YAW (deg) |
|---|---|---|---|---|---|---|
| FRAME A | -230.3 | -20.72 | 6.43 | 0.959 | -1.179 | -176.737 |
| FRAME B | -231.7 | -20.83 | 6.44 | 1.222 | -1.231 | -176.852 |

Fig. 16

INERTIAL NAVIGATION SENSOR INTEGRATED OBSTACLE DETECTION SYSTEM

FIELD OF THE INVENTION

The invention pertains to navigational detection systems. Particularly, the invention pertains to passive obstacle detection systems which use passive (TV, FLIR) sensors and make selective use of an active (laser) sensor. Work on the present invention was done under NASA contract NAS2-12800.

BACKGROUND OF THE INVENTION

Detection and avoidance of obstacles are very important to the navigation of ground and air vehicles. A system which can provide autonomous obstacle detection and avoidance is needed for such vehicles. The development of an autonomous system can be achieved by the use of active sensors (millimeter wave (MMW) radar, laser radar), passive sensors (television or forward looking infrared (FLIR)), or a combination of active and passive sensors.

An active system (MMW or laser) requires a very specialized and expensive sensor system. The active system risks detection by the enemy in a battle environment. Such system does not maximize usage of passive sensor technology.

Various active systems are most advantageous in certain kinds of environments. For all weather conditions, MMW radar is better suited than laser radar. However, for terrain following and avoidance, and obstacle detection and avoidance, laser radar is preferred because it is less susceptible to detection by the enemy and has the necessary resolution to detect wires (e.g., a 3 millimeter (mm) diameter wire at a 40 meter distance), while MMW radar operating at 94 gigahertz (GHz) having a wavelength about 3 mm, is marginally satisfactory. A laser sensor is also better than a MMW sensor for detecting objects like thin wires at oblique angles. For day/night operation and countermeasure resistance, both laser and MMW sensors are equally good. In view of the above trade-offs between MMW and a laser radar, a laser ranging system is preferable. However, many laser scanners are not adequate for such systems due to their slow scan rate and a lack of a large field of view (needed for providing a sufficient number of alternate directions of travel for a vehicle when an obstacle is encountered) for successful vehicle navigation.

Compared to active systems, a passive system has the benefit of covertness, simplicity, reduced cost and ease of manufacture. Obstacle detection using passive sensors permits the use of two fundamental techniques for ranging—binocular stereo and motion stereo (optical flow). With the binocular stereo technique, ranging performance is a function of the sensor resolution and the lateral displacement between the two sensors; increased displacement increases the maximum range measurement and improves range resolution. For vehicles, sensor displacement is limited by the dimension of the vehicle. The technique of motion stereo utilizes one sensor from which images are collected at regularly timed intervals while the sensor is in motion. By observing the amount of motion (on an image plane) that a world point exhibits between frames and using knowledge of sensor motion, range to the world point can be computed. The resolution of motion stereo techniques is limited only by the resolution of the sensor.

SUMMARY OF THE INVENTION

The present invention uses an active laser in combination with passive devices. The invention is a maximally passive system, called ODIN (Obstacle Detection using Inertial Navigation), for obstacle detection and avoidance. It is based upon an inertial navigation sensor integrated optical flow method and a selective application of binocular stereo and laser radar ranging.

The invention addresses the problem of integrating inertial navigation sensor (INS) information with optical flow measurements made over multiple frames to compute the range to world points that lie within the field of view of the sensors. Context dependent scene analysis (used to characterize the image regions) and multiframe filtering (used to predict and smooth range values) provide an improved range map. The INS integrated motion and scene analysis leads to a robust passive ranging technique useful for obstacle detection and avoidance for land and air vehicle navigation.

The obstacle detection system integrates inertial sensor information with optical flow and image characterization components to detect obstacles and provide safe path for navigation. The system includes the inertial navigation sensor, the optical flow component system, the sensor suite consisting of passive and active sensors, the context dependent image characterization component system, qualitative scene model, range calculations and interpolation.

The kind of inertial navigation sensor information that is used in the obstacle detection system include true heading (yaw), pitch angle, roll angle, inertial vertical speed, North-South velocity and East-West velocity which are used in the optical flow component system and image characterization component system. Additionally, position latitude, position longitude, ground speed, true track angle, body roll rate, body yaw rate, body longitudinal acceleration, body lateral acceleration, body normal acceleration, track angle rate, and inertial altitude can also be used to synchronize different data rates and to achieve increased accuracy.

The technique by which inertial navigation sensor data is used in the obstacle detection system includes the integration of inertial navigation sensor data with the optical flow component of the system to obtain instantaneous direction of vehicle heading (focus of expansion) and to compensate the rotation (roll, pitch and yaw) of the current frame with respect to the previous frame. This leaves only the translation motion between the frames which leads to the determination of range values. The technique also includes the integration of inertial navigation sensor data with the context dependent image characterization component system to achieve accurate segmentation from frame-to-frame by compensating for rotation (roll, pitch and yaw) and translation between frames.

The optical flow component system includes interest point extraction, derotation, and matching between frames, computation of the focus of expansion from inertial navigation data, computation of range values to world points based on a camera model, matching of interest points using inertial navigation data and image characteristics, and filtering of range values over multiple frames to reduce noise effects and obtain consistent range values.

BRIEF DESCRIPTION OF THE DRAWINGS

FIG. 13 is a table which provides the parameters of the sensor suite of the invention.

FIG. 14 is a table which gives the coordinates of synthetic interest or world points used in the application of the invention.

FIG. 15 is a table which indicates the location, row, pitch, and yaw of the camera or sensor for two synthetic frames used in the application of the invention.

FIG. 16 is a table which reveals the location, row, pitch, and yaw of the camera or sensor for two frames of real imagery in the invention.

DESCRIPTION OF THE PREFERRED EMBODIMENTS

Figure 1:
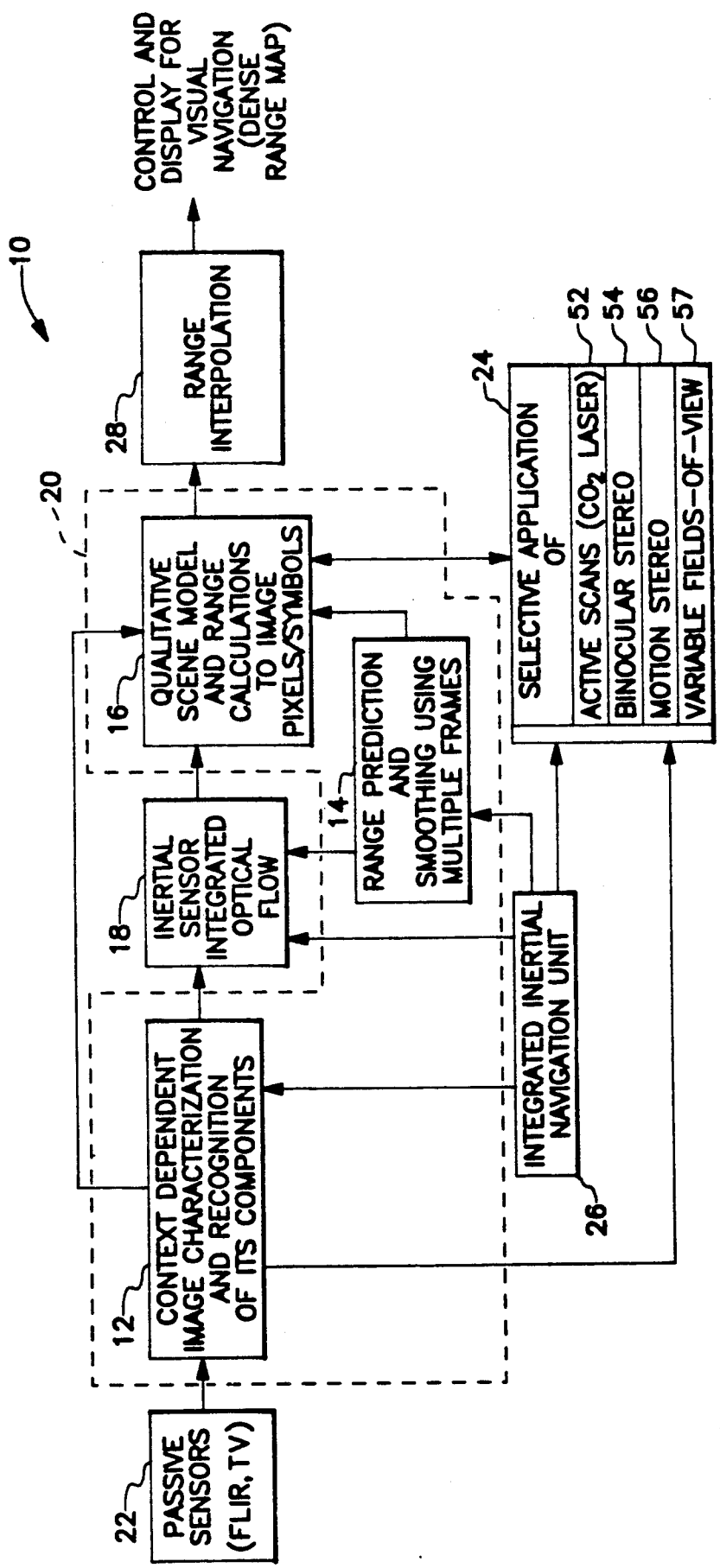
FIG. 1 is a block diagram of the obstacle detection and avoidance system.

The present invention, obstacle detection and avoidance system 10, is maximally passive in that it combines data obtained from an inertial navigation sensor (INS) 26 with optical flow computations in inertial sensor integrated optical flow unit 18 of FIG. 1. The use of the INS data permits an accurate computation of range to each world point based solely upon the movement (between frames) of each world point's projection onto the image plane. FIG. 1 illustrates inertial sensors integrated optical flow unit 18 and scene analysis unit 20, incorporating context dependent image characterization and recognition of its components unit 12, range prediction and smoothing (using multiple frames) unit 14 and qualitative scene model and range calculations (to image pixels/symbols) unit 16, using selective application 24 of binocular stereo 54 (passive), laser radar 52 (active) ranging, motion stereo 56 and variable fields of view 57. The output is from range interpolation unit 28 which is connected to unit 16.

The incorporation of inertial data from unit 26 into motion stereo 56 of unit 18 provides a robust approach. Traditional techniques suffer greatly from errors in the estimation of the location of the focus of expansion (FOE) and from errors in matching world points between frames. Inertial data enable unit 18 to compute the exact location of the FOE and remove the effect that sensor motion (i.e., roll, pitch and yaw) has upon the imagery; thus, the motion is effectively reduced to pure translation. When the motion consists solely of translation, the task of world point matching is greatly simplified. The end result is that more world points are assigned matches from frame to frame and that the range measurements have improved accuracy.

Figure 2:
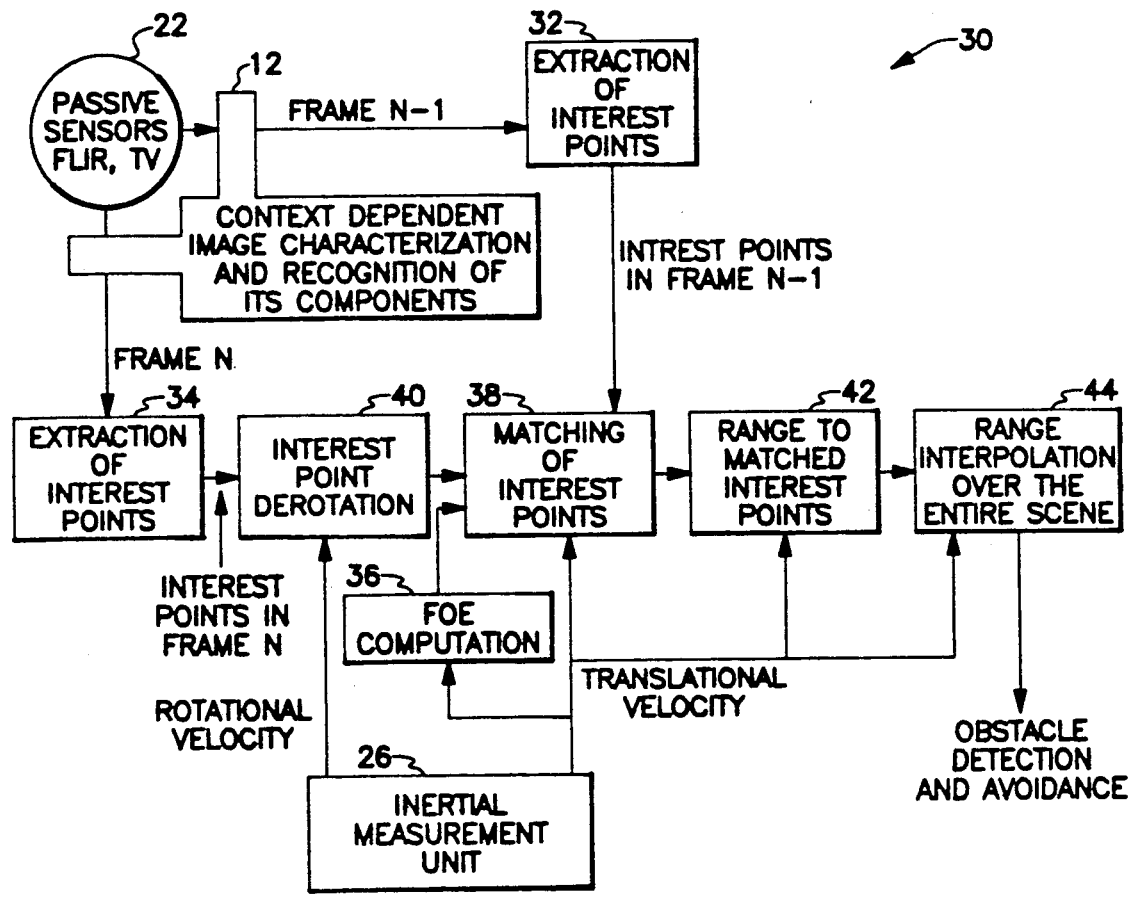
FIG. 2 illustrates the major portions of the inertial sensor integrated optical flow unit.

For a pair of image frames, the major steps of optical flow method 30 as shown in FIG. 2 begin with input frames, frame N−1 and frame N which are digitized video or FLIR images, being read in from passive sensors 22 along with units 32 and 34 wherein interest points are extracted from input frames N−1 and N. The extracted interest points are sent to interest point matcher 38 and interest point derotation unit 40, respectively. Location of the focus of expansion (FOE) (in both frames N−1 and N) is computed in FOE computational unit 36. Computational unit 36 output goes to interest point matcher 38. Inertial measurement unit 26 outputs rotational velocity information to derotational unit 40 and translational velocity information to FOE computational unit 36, range to interest points unit 42 and range interpolation over the entire area unit 44. FOE and the interest points in frame N are projected onto an image plane that is parallel to the image plane that captured frame N−1 (derotation of frame N). Interest points in frame N are matched to those of frame N−1 based upon four criteria. Range is computed to each interest point in frame N that has a match in frame N−1. A dense range map is created using context dependent scene analysis and interpolating between the computed range values.

Figure 3:
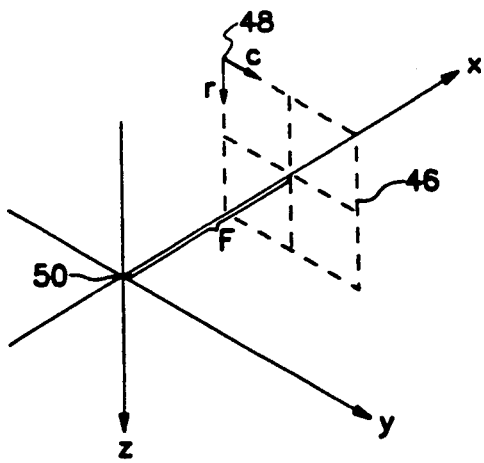
FIG. 3 shows a three-dimensional coordinates system in conjunction with a two-dimensional image plane and its own coordinate system.

The imagery to system 30 is digitized and contains pixels addressed by row and column with the origin of 2-D coordinate system 48 of FIG. 3 located in the upper left corner of the image. The horizontal axis, c, points to the right and the vertical axis, r, is in the downward direction. This image plane 46 is perpendicular to the x axis of 3-D coordinate system 50 and is located at a distance of the focal length F from the origin with the z axis in the downward direction. Therefore, the pixels in image plane 46 can be described in 2-D coordinate frame 48 as (c, r) and in 3-D coordinate frame 50 by the vector (F, y, z). The geometry described above is graphically illustrated in FIG. 3.

As shown in FIG. 2, the data input to the obstacle detection method 30 consists of a sequence of digitized video or FLIR frames that are accompanied by inertial data consisting of rotational and translational velocities. This information, coupled with the temporal sampling interval between frames, is used to compute the distance vector, $\vec{d}$, between each pair of frames and the roll, pitch and yaw angles, ($\phi$, $\theta$, $\psi$), of each frame. Both $\vec{d}$ and ($\phi$, $\theta$, $\psi$) are crucial to method 30.

The movement of the world points' (i.e., interest points') perspective projection (onto the image plane 46) is at a minimum near the FOE and, as a result, the range to the world or interest points nearest the FOE have the greatest amount of uncertainty associated with them. The passive ranging technique of binocular stereo 54 is most accurate near the center of the field of view (where the FOE is located most of the time) and is less accurate near the edges of the field of view. In addition, the binocular stereo 54 approach can function even when the vehicle is stopped or hovering.

Wires and other small obstacles are detected by active sensor 52 and passive techniques 54 and 56 because of the greater resolution 57 (FIG. 1) and 64 (FIG. 4a) required to detect such obstacles at a range sufficient for obstacle avoidance. A trade-off is made between the field of view and resolution of the sensor(s). Since the system's field of view must be large enough such that the vehicle has sufficient (previously scanned) directions in which to steer when obstacles are detected, the field of view of the passive sensors can not be reduced; hence, laser range scanner 52 and a narrow FOV passive sensor function in conjunction with passive sensors 54 and 56 of system 10. The use of a simple (i.e., circular scanning) laser range sensor 52, whose scan pattern is centered around the FOE, is for the purpose of detecting only small obstacles that lie within the vehicle's direction of travel.

Figure 4A:
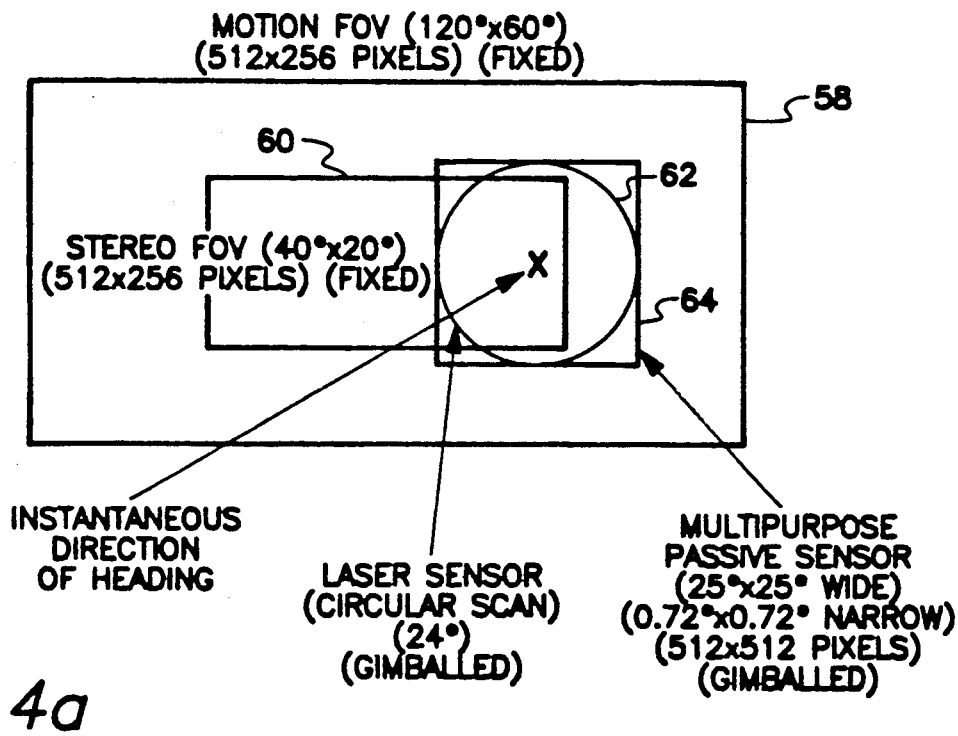
FIG. 4a illustrates overlapping fields-of-view for several types of sensing.

An illustration of the overlapping fields of view 58, 60 and 62, respectively, of the three types of sensing (optical flow 56, binocular stereo 54, and laser sensor 52) is in FIG. 4a. A combination of these types of sensors yields a robust obstacle detection and avoidance system. Laser sensor 52 provides sufficiently high resolution not provided by passive means 54 and 56. Limited field of view 62 of laser beam sensor 52 sacrifices little covertness, and the simplicity of its scanning pattern keeps acquisition time short and hardware complexity low. Gimbaled laser scanner 52 can also be used to quickly investigate avenues of safe passage when obstacles have been encountered which block the current vehicle path. Multipurpose passive sensor FOV 64 encompasses laser sensor FOV 62.

Figure 4C:
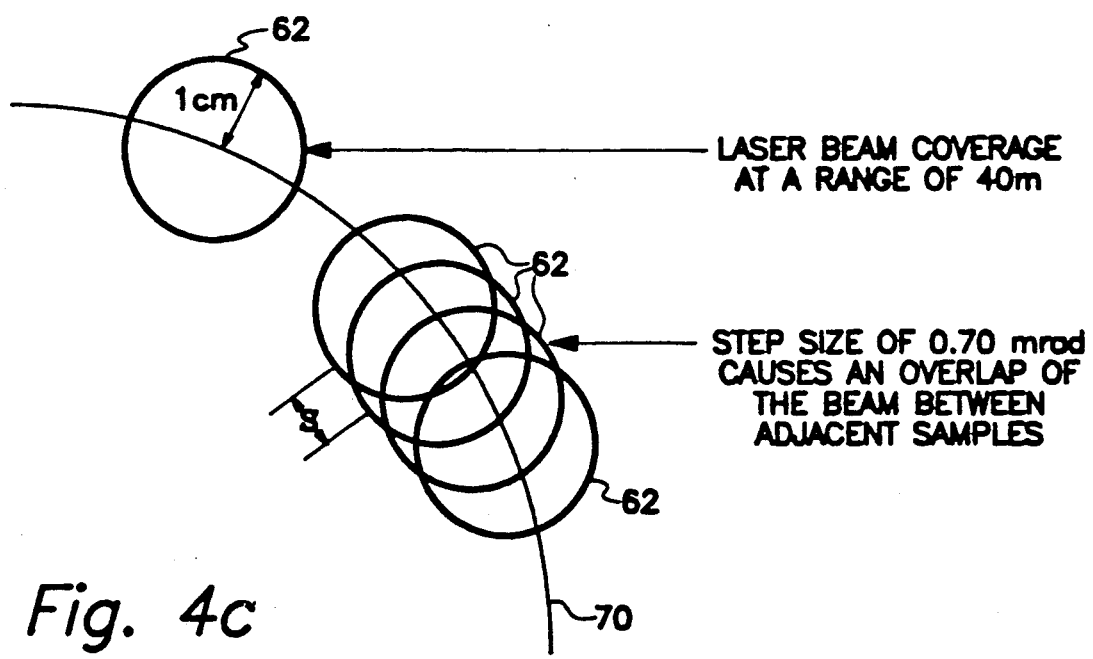
FIG. 4c reveals the field of view and beam coverage of a laser beam at a given range.
Figure 4B:
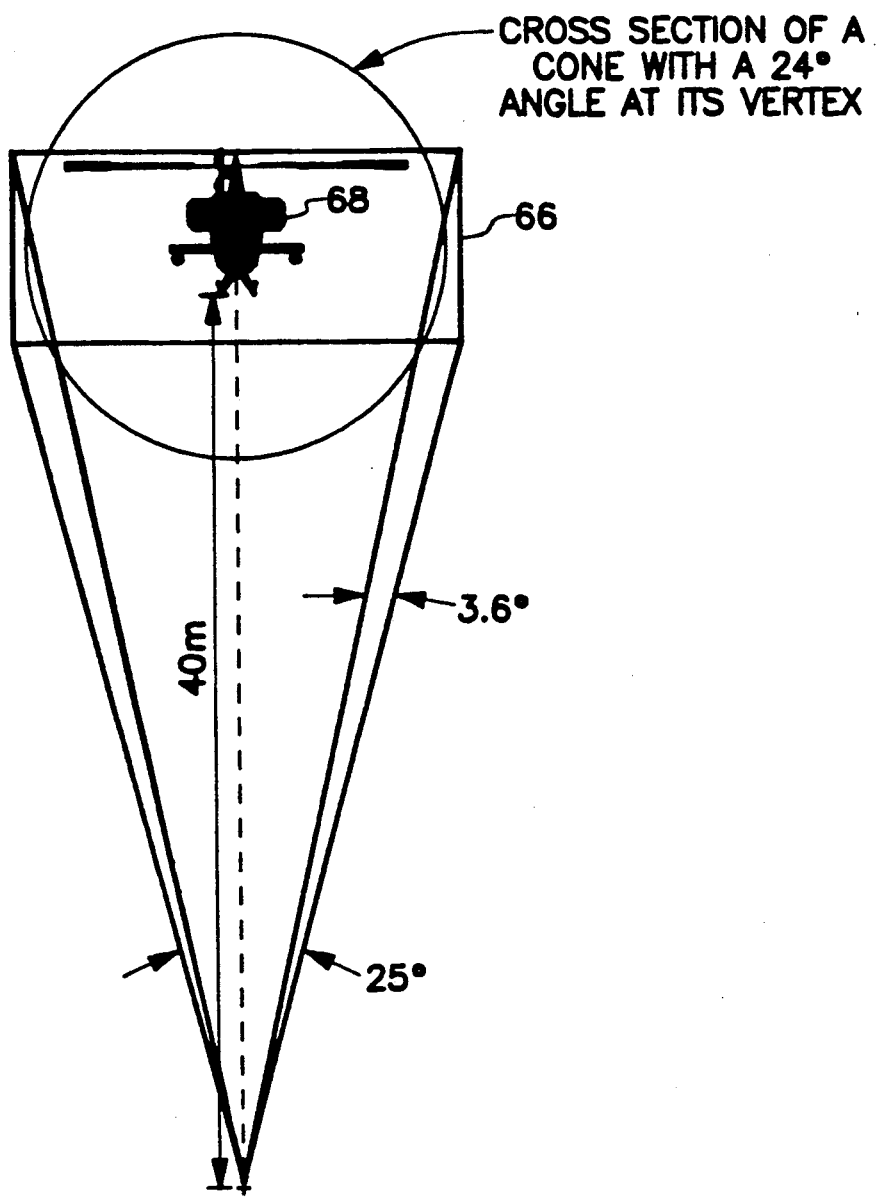
FIG. 4b shows the size of sensing field of view which is required to detect the tickler sized obstacles for a given range.

FIG. 4b illustrates the size of sensor FOV 66 which is required to detect obstacles at a range of 40 meters in the flight path of rotorcraft 68. In FIG. 4c, a 0.5 milliradian (mrad) laser beam width having FOV 62 scans in circular pattern 70. Step size S used in scanning is 0.70 mrad (in the plane of scan circle 70), leading to 8,900 samples in $2\pi$ radians. At a range of 40 meters, the laser beam is 2 cm in diameter which leads to an overlap of the beam between samples. This overlap and small step size S result in 4 range samples being acquired, at the range of 40 meters, on a wire of 3 mm diameter which is perpendicular to the tangent to scanning circle 70. Laser range samples yield obstacle detections. The range values are compared to a minimum acceptable range threshold. World points having a rang less than this threshold are a danger to the vehicle.

Table 1 lists sensor types and typical parameters for FOV, array size, instantaneous FOV, and resolution.

Each sensor and its function may be described, with emphasis on obstacle detection and avoidance in the context of rotorcraft navigation. First note that there are two types of sensor mountings—those of gimbal controlled orientation and those of fixed orientation.

Motion stereo sensor 56, which is of fixed orientation, is used to generate a sparse range map of world features over FOV 58. The wide FOV 58 is required for the sparse range map to provide suitable options for rotorcraft 68 maneuvering when an obstacle is encountered. Binocular stereo sensor 54 is used to provide range measurements over a medium FOV 60 that is centered within wide FOV 58 of motion stereo sensor 56. The purpose of binocular stereo sensor 54 is to provide range samples within the area where the motion stereo 56 measurements are the most error prone, around the instantaneous direction of vehicle heading (i.e., focus of expansion), which lies mainly within the center of FOV 58. In addition, the binocular stereo 54 measurements can be made when a vehicle is stationary (e.g., when rotorcraft 68 is hovering or when it is turning about its vertical axis without forward motion), thereby providing a range map which can be used to perform obstacle detection. Both the binocular 54 and motion 56 stereo sensors use TV or FLIR imagery to perform these measurements for day and night operations.

Two kinds of sensors are mounted on a gimbaled platform—a variable FOV passive sensor (TV or FLIR) 22 and a scanning laser range finder 52. Placing the sensors on a gimbal allows their FOV's to be constantly focussed in the direction of rotorcraft travel, which is necessary since the sensors must be able to detect large and small obstacles (such as wires) which lie in the immediate path of the rotorcraft. Laser range finder 52 actively scans for obstacles and the passive sensor data are used to perform motion stereo 56 measurements or to simply extract two-dimensional (2-D) features which have a high probability of being obstacles (e.g., linear features of poles, wires, etc.).

An additional benefit of having gimbaled sensors is that sensors' FOV's can be directed to an alternate flight corridor when obstacles are detected in the current corridor of the vehicle. Turning the sensors to the alternate corridor is necessary to determine the suitability of the corridor prior to executing a change in the flight path as part of the obstacle avoidance task. The alternate flight corridors are determined from the range measurements made by wide FOV fixed position sensors 56 and 54. In addition, the gimbaled sensors can be directed on a potential landing site for the purpose of obstacle detection prior to landing. In the air vehicle scenario, the gimbaled sensors may also be controlled by helmet mounted sensors.

Wide FOV 58 of motion stereo sensor 56 is chosen to provide a wide, cleared area in which a lateral maneuver may be performed if an obstacle is detected. The vertical FOV is half of the horizontal FOV due to the nature of nap-of-the-Earth flight (in the air vehicle rotorcraft scenario) in which vertical maneuvers are not desired and lateral maneuvers are emphasized. Binocular stereo sensor 54 has a smaller, more conventional FOV 60 which is centered within motion stereo FOV 58 to compensate for range measurement error that occurs near the FOE in motion stereo measurements and to provide range measurements when the rotorcraft is not undergoing forward translation.

The gimbaled sensors are designed to track the FOE of vehicle motion. Tracking the FOE with the high resolution passive and laser sensors provides the most accurate ranging techniques where they are needed most. The FOE is not the only location that needs to be sensed by the gimbaled sensors. To perform obstacle avoidance, i.e., to select a new flight corridor, and to 'clear' a ground location prior to landing, the gimbaled sensors must be directed automatically by obstacle detection signals from unit 44 of FIG. 2, or manually by the pilot or co-pilot. Laser 52 detection of an obstacle can be confirmed with data from the passive, gimbaled sensor whose line of sight is parallel with that of the laser sensor.

Once range samples are obtained from the various sensors, the next step involves obstacle detection to be followed by obstacle avoidance. This requires that the computed range map for the scene be sufficiently dense (so as to extract the discontinuities in the range map; these discontinuities correspond to the presence of obstacles) or a model for the scene be available. A model means a segmentation of the sensed image in which the various segments are labeled as to their respective types of terrain (sky, road, grass, etc.). Context dependent image characterization, also called "scene analysis," is applied to each frame, resulting in a model of the scene which aids in the identification of safe paths and aids the process of increasing the density of the range map.

Interpolation of the range values obtained by the optical flow method of system 30 of FIG. 2, is aided by results of scene analyses. Having information about the scene allows for intelligent interpolation between the range values. For example, when range values fall on two trees separated by 25 meters of unobstructed space, the scene model can be used to prevent the range interpolation from connecting the trees and blocking off the space between them. The result is a more dense and accurate range map which can subsequently be used for obstacle avoidance.

The features within the imagery (TV or FLIR) that are most prominent and distinguished, mark the world points to which range measurements will be made. These prominent world points, known as interest points, are easy to extract from the imagery and have the highest promise of repeated extraction throughout multiple frames. The interest points within the field-of-view of the monocular sensor are of fundamental and critical importance to optical flow calculations. The extraction and subsequent use of interest points are described below.

Interest point selection involves computation of distinguishable points which is accomplished by passing a Moravec operator over each frame of imagery. The operator is applied to each image pixel (within a desired offset from the image border) which was identified as a strong edge pixel by a Sobel edge operator. The interest operator examines all pixels within a square window, of side length L, that surrounds each edge pixel and computes the relative variance between pixel values. As each pixel within the window is examined, the square of the difference between its value and the values of its neighboring pixels is computed and summed. Actually, four different sums are recorded which correspond to the same four neighbors relative to each pixel within the window; there is a sum for the square of the difference between the current pixel and its neighbor to the right and likewise for three other neighbors (below, below & right, below & left). After each pixel under the window has contributed to the four sums, the smallest of the sums, S, is selected and stored as the pixel's value. A pixel is deemed an interest point if its assigned value of S is greater than the corresponding sum generated at each pixel within a square window of side length K, centered on the pixel in question. In the discussion that follows, a pixel's value of S will be referred to as its interestingness.

Implementation of the Moravec operator ranks the detected interest points (pixels with a value of S which is a local maximum) in the order of their computed interestingness. This interest point extraction routine works on the segmented image obtained by context dependent scene analysis 12 (FIG. 1). Segmentation divides the image into M uniform regions. Interest point routine returns only the N points within each region which have the highest values of S, where N and M are inputs to the program. Th result of returning only the best interest points (in terms of S) in each region is that the processed scene is intelligently covered with interest points. If this were not the case, a small number of occasionally adjacent regions will lay claim to the major portion of interest points.

Note that not all regions within a scene can contain reliable interest points (e.g., wave crests on a body of water are not good interest points). As mentioned above, image characterization 12 is used to ascertain the goodness of regions prior to interest point selection. Interest point selection can be further improved by incorporation of Kalman filtering techniques, which use inertial sensor data to track and predict interesting point features.

Figure 5:
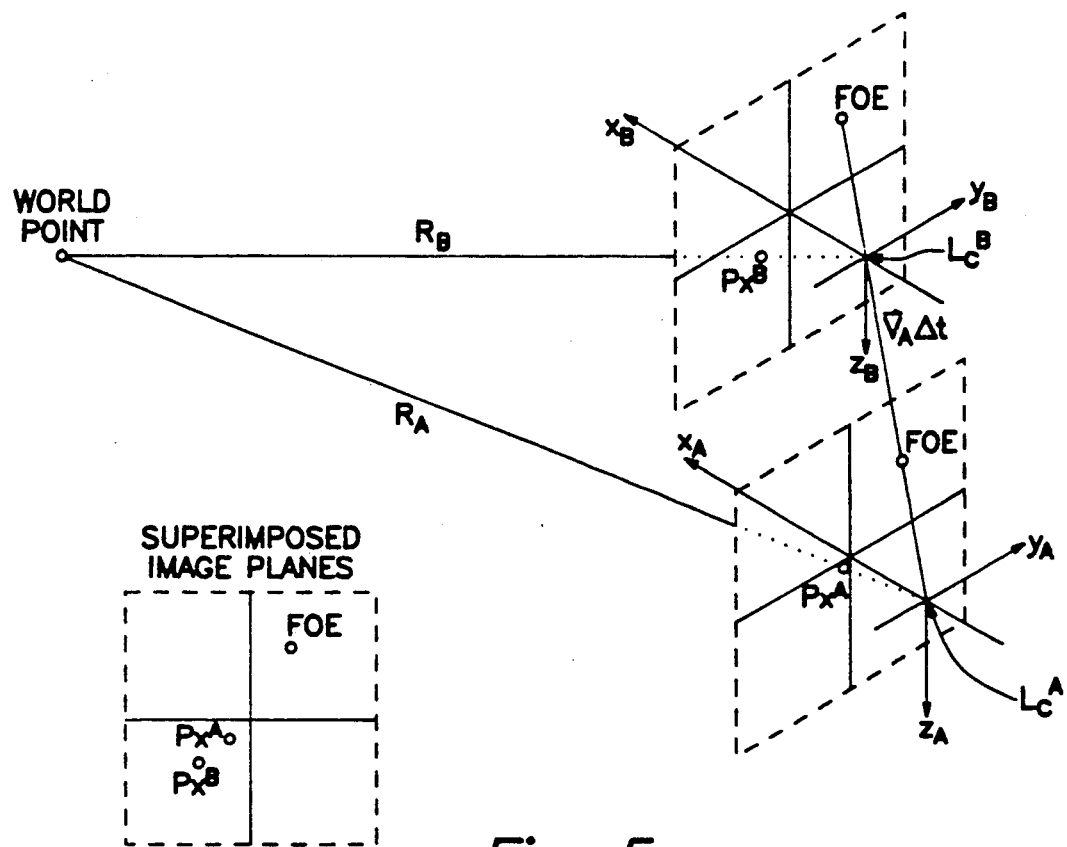
FIG. 5 shows the sensor geometry for two perspective views of the scene at two positions separated by a given distance.

Interest point derotation aids the process of interest point matching. One must make it seem as though image plane B is parallel to image plane A. If this is done, the FOE and pairs of interest points in frames A and B that match, would ideally be colinear should the image planes be superimposed (see FIG. 5). FIG. 5 is an illustration of the sensor geometry that records two perspective views of a scene at two positions separated by a distance $|\vec{v}|\Delta t = |\vec{d}|$ (with no rotation of the sensor between positions). When there is no rotational change between image frames, there is a special property of the perspective projection of a world point onto the two image planes; the FOE and the projections of the world point are all colinear.

To make the image planes parallel, derotation is performed for each vector, $(F, y_i, z_i)$, that corresponds to each interest point in frame B. The equation for the derotation transformation and projection (in homogeneous coordinates) is:

$$\begin{bmatrix} F \\ y_i' \\ z_i' \\ 1 \end{bmatrix} = P\, R_{\phi_A}^{-1} R_{\theta_A}^{-1} R_{\psi_A}^{-1} R_{\psi_B} R_{\theta_B} R_{\phi_B} \begin{bmatrix} F \\ y_i \\ z_i \\ 1 \end{bmatrix} =$$

$$P\, C_{NED}^{A}\, C_{B}^{NED} \begin{bmatrix} F \\ y_i \\ z_i \\ 1 \end{bmatrix}$$

where $$R_\phi = \begin{bmatrix} 1 & 0 & 0 & 0 \\ 0 & \cos\phi & \sin\phi & 0 \\ 0 & -\sin\phi & \cos\phi & 0 \\ 0 & 0 & 0 & 1 \end{bmatrix} \quad R_\theta = \begin{bmatrix} \cos\theta & 0 & -\sin\theta & 0 \\ 0 & 1 & 0 & 0 \\ \sin\theta & 0 & \cos\theta & 0 \\ 0 & 0 & 0 & 1 \end{bmatrix}$$

$$R_\psi = \begin{bmatrix} \cos\psi & \sin\psi & 0 & 0 \\ -\sin\psi & \cos\psi & 0 & 0 \\ 0 & 0 & 1 & 0 \\ 0 & 0 & 0 & 1 \end{bmatrix} \quad P = \begin{bmatrix} 1 & 0 & 0 & 0 \\ 0 & 1 & 0 & 0 \\ 0 & 0 & 1 & 0 \\ 1/F & 0 & 0 & 0 \end{bmatrix}$$

and where NED (north, east, down) is the coordinate frame in which inertial measurements are made. Use of the NED frame assumes that vehicle motion is "local" to a patch of Earth.

The matrix P projects a world point onto an image plane and is used to compute the FOE, FOE=P $\bar{d}$, where $\bar{d}=\bar{v}\Delta t$. The matrix $C^A{}_{NED}$ converts points described in the NED coordinate frame into an equivalent description within a coordinate frame parallel to the A coordinate frame. Likewise, the matrix $C_B{}^{NED}$ converts the descriptions of points in the B coordinate frame into descriptions in a coordinate frame parallel to NED.

The matching of interest points is performed in two passes. The goal of the first pass is to identify and store the top three candidate matches for each interest point in frame B, $(F, y_{Bj}, z_{Bj})$. The second pas looks for multiple interest points being matched to a single point in frame A. Hence, the result of the second pass is a one-to-one match between the interest points in the two successive frames. For the present embodiment, a one-to-one match of interest points is necessary. The projection onto the sensor's image plane of an object in the world will grow in size as the sensor moves toward the object. This situation might imply that a one-to-one match is nonsensical since what was one pixel in size in frame A might become two or more pixels in size in frame B. It is assumed that the growth of objects, in terms of pixel size, is negligible in the passive ranging for obstacle detection scenario. All objects are assumed to be at certain safe distances for vehicle maneuvering and one pixel (of interest point quality) in two frames is all that is required of an object's surface for the range to the object to be computed.

Figure 6A:
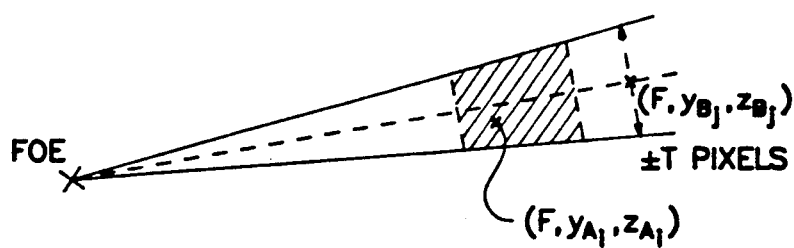
FIGS. 6a and 6b reveal two ways of computing the distances of interest or world points from the focus of expansion.
Figure 6B:
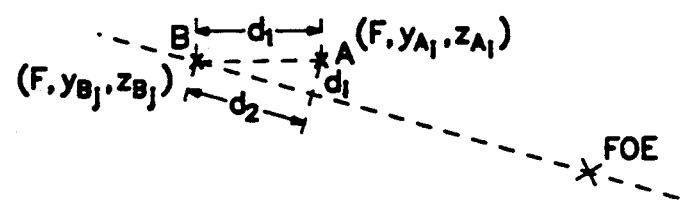

The first pass is described in the following. To determine the candidate matches to $(F, y_{Bj}, z_{Bj})$, each of the interest points in frame A is examined with the successive use of four metrics. The first metric makes certain that candidate matches lie within a cone shaped region bisected by the line joining the FOE and the interest point in frame B. This metric limits candidate matches to lie within the cone with apex at the FOE, as shown in FIG. 6(a). If an interest point in frame A, $(F, y_{Ai}, z_{Ai})$, passes the first metric, then the second metric is applied to it. The second metric requires that the interestingness of candidate matches is close to the interestingness of the point that we are trying to match. (FIGS. 6a and 6b show constraints used to aid the process of matching interest points between frames.)

The third metric restricts all candidate matches in frame A to lie closer to the FOE than the points of frame B (as physical laws would predict for stationary objects). This metric involves the computation of the distances of the interest points from the FOE, which can be computed in two different ways. The first is the direct euclidean distance, $d_1$, between $(F, y_{Ai}, z_{Ai})$ and $(F, y_{Bj}, z_{Bj})$, and the second is the distance $d_2$ which is the projection of $d_1$ onto the line joining $(F, y_{Bj}, z_{Bj})$ and the FOE. The distance measures are graphically illustrated in FIG. 6(b). Regardless of the way that the distance measure is computed, it can be used to identify the closest candidate matches to $(F, y_{Bj}, z_{Bj})$.

The fourth metric constrains the distance between an interest point and its candidate matches. For an interest point in frame A, $A_j$, to be a candidate match to point $B_j$, it must lie within the shaded region of FIG. 6(a). The depth of the region is determined by this fourth metric while the width of the region is fixed by an earlier metric. By limiting interest points, $A_j$, to lie in the shaded region, one has effectively restricted the computed range of resulting matches to lie between $R_{max}$ and $R_{min}$. The reasoning behind this restriction is that world objects of range less than $R_{min}$ should not occur due to autonomous or manual navigation of the vehicle, thus avoiding potential collisions. Likewise, objects at a range greater than $R_{max}$ are not yet of concern to the vehicle.

The result of the first pass of interest point matching is a list, for each $(F, y_{Bj}, z_{Bj})$, of three or fewer candidate matches that pass all metrics and have the smallest distance measures of all possible matches.

The goal of the second pass of the matching process is to take the matches provided by the first pass and generate a one-to-one mapping between the interest points in frames A and B. Initially, it can be assumed that the best match to match to $(F, y_{Bj}, z_{Bj})$ will be the stored candidate match which has the smallest distance measure. However, there may be multiple points, $(F, y_{Bj}, z_{Bj})$, which match to a single $(F, y_{Ai}, z_{Ai})$. Hence, the recorded list of best matches is searched for multiple occurrences of any of the interest points in frame A. If multiple interest points in frame B have the same best match, then the point, B*, which is at the minimum distance from the $A_i$ in question, will retain this match and is removed from the matching process. The remaining $B_j$'s are returned to the matching process for further investigation after having $A_i$ removed from their lists of best matches. This process continues until all of the interest points in frame B either have a match, or are determined to be unmatchable by virtue of an empty candidate match list. Thus, the final result of the matching process is a one-to-one mapping between the interest points in frames A and B.

Given the result of interest point matching, which is the optical flow, range can be computed to each match. Given these sparse range measurements, a range or obstacle map can be constructed. The obstacle map can take many forms, the simplest of which consists of a display of bearing versus range. The next step is range calculation and interpolation.

Given pairs of interest point matches between two successive image frames and the translational velocity between frames, it becomes possible to compute the range to the object on which the interest points lie. One approach to range, R, computation is described by the equation $$R = \Delta Z \frac{x' - x_f}{x' - x}$$

where
$x_f$ = the distance between the FOE and the center of the image plane,
$x$ = the distance between the pixel in frame A and the center of the image plane,
$x'$ = the distance between the pixel in frame B and the center of the image plane,
$\Delta Z = |\bar{x}\Delta\cos\alpha|$ = the distance traversed in one frame time, $\Delta t$, as measured along the axis of the line of sight,
$\alpha$ = the angle between the velocity vector and the line of sight,
$x' - x_f$ = the distance in the image plane between $(F, y_{Bi}, Z_{Bi})$ and the FOE, and
$x' - X$ = the distance in the image plane between $(F, y_{Bi}, Z_{Bi})$ and $(F, y_{Ai}, Z_{Ai})$.

Figure 7:
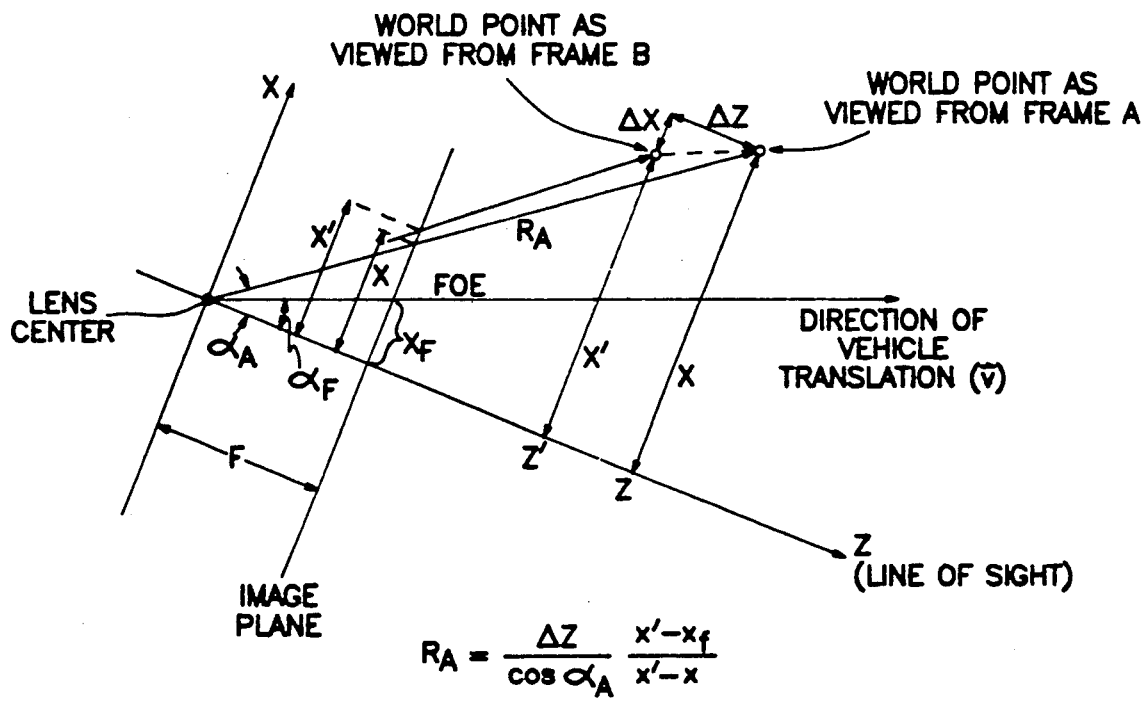
FIG. 7 reveals the geometry for calculating the range from an interest or world points viewed from two different frames of imagery.

These variables are illustrated in FIG. 7, wherein the geometry involved in the first approach to range calculation is also illustrated. FIG. 7 shows the imaged world point in motion rather than the sensor, thereby simplifying the geometry.

Figure 8:
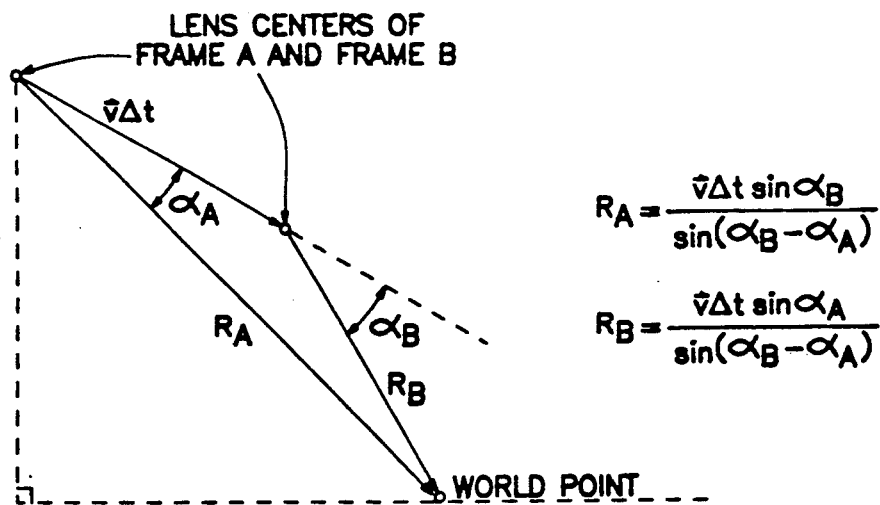
FIG. 8 reveals an alternate approach for range calculation from an interest or world point from two frames of imagery.

An alternate approach involves the calculation of the angles $\alpha_A$ and $\alpha_B$ between the translational velocity vector and the vectors that describe the matched pair of interest points in frames A and B, $$R_A = \frac{|\vec{v}| \Delta t \sin \alpha_B}{\sin(\alpha_B - \alpha_A)}$$

as indicated in FIG. 8, wherein range calculation requires the computation of angles between the linear velocity vector and the vectors that describe the matched pair of interest points. Both of the range calculating techniques compute the distance to a world point relative to the lens center of frame A (similar equations would compute the distance from the lens center of frame B). The accuracy of the range measurements that result from either approach is very sensitive to the accuracy of the matching process as well as the accuracy of the inertial measurement unit (IMU) data.

The task of range interpolation is the last processing step required in the passive ranging system (excluding any postprocessing of the range that may be required before the processed data reaches the automatic vehicle control and display systems). By means of range interpolation between the sparse range samples generated from the optical flow measurements, a dense range map representing the objects within the field of view is established. Essentially, this task is surface fitting to a sparse, nonuniform set of data points. To obtain an accurate surface fit that physically corresponds to the scene within the field of view, it is necessary that the sparse set of range samples correspond to the results obtained from scene analysis. As mentioned above, image segmentation, context dependent image characterizations and recognition of its components 12 (FIG. 1) are used to create regions from which a desired number of interest points are extracted.

The type of surface fitting utilized is significant because the resulting surface (i.e., the range map) must pass through each of the range samples. It would be particularly detrimental if the surface passed under any range samples. Many techniques of surface fitting are applicable to the present task.

One type of range interpolation consists of a fitting of planes to the available range samples. This approach accomplishes the task efficiently and succeeds in passing through each range sample. Any technique of range interpolation needs to avoid interpolation over discontinuities that occur between range samples on the surface of concern. With scene analysis/segmentation, the smoothing of discontinuities is avoided by interpolating only over smooth regions or segments of the scene.

Range computation (based on 2 frames) is further improved by estimating range over multiple frames. The procedure for prediction and smoothing of range using multiple frames 14 (FIG. 1) is that for all interest points in a pair of images, compute matching confidence, measured and predicted ranges, confidence in range and threshold the result are computed to obtain the final range.

Matching Confidence of the point in frame n is given $$C_{mi}^n = \omega_1 \left[ 1 - \frac{|I_{iA} - I_{iB}|}{\max I_{AB} - \min I_{AB}} \right] + \omega_2 \left[ 1 - \frac{|d_i^n - \min_i d_i^n|}{\max_i d_i^n - \min_i d_i^n} \right]$$

$$\max I_{AB} = \max_i \{I_{iA}, I_{iB}\}$$

$$\min I_{AB} = \min_i \{I_{iA}, I_{iB}\}$$

where $\omega_1, \omega_2 \geq 0$ and $\omega_1 + \omega_2 = 1$. $I_{iX}$ is the interestingness of ith point in frame X. $d_i$ is the projection of ith point (point A in FIG. 6b) on the line connecting FOE with its match (point B in FIG. 6b). Range confidence of ith point in frame n is given by the following set of equations.

$$R_{ifinal}^o = R_{ipredicted}^o = R_{imeasured}^o$$
$$C_{Ri}^o = 1$$

$$C_{Ri}^n = C_{mi}^n \left[ 1 - \frac{|R_{imeasured}^n - R_{ipredicted}^n|}{R_{imeasured}^n + R_{ipredicted}^n} \right]$$

$$R_{ipredicted}^n = R_{ifinal}^{n-1} - \text{velocity}_i \times \text{time} \quad R_{ifinal}^n = R_{imeasured}^n + C_{Ri}^n (R_{imeasured}^n - R_{ipredicted}^n)$$

if $(R_{ipredicted}^n \leq 0)$ then \quad if $(R_{ifinal}^n < 0)$ $$R_{ifinal}^n = R_{ipredicted}^n = R_{imeasured}^n \text{ and}$$
$$C_{Ri}^n = 1 \qquad R_{ifinal}^n = \frac{R_{imeasured} R_{ipredicted}}{R_{imeasured} + R_{ipredicted}}$$

Figure 9A:
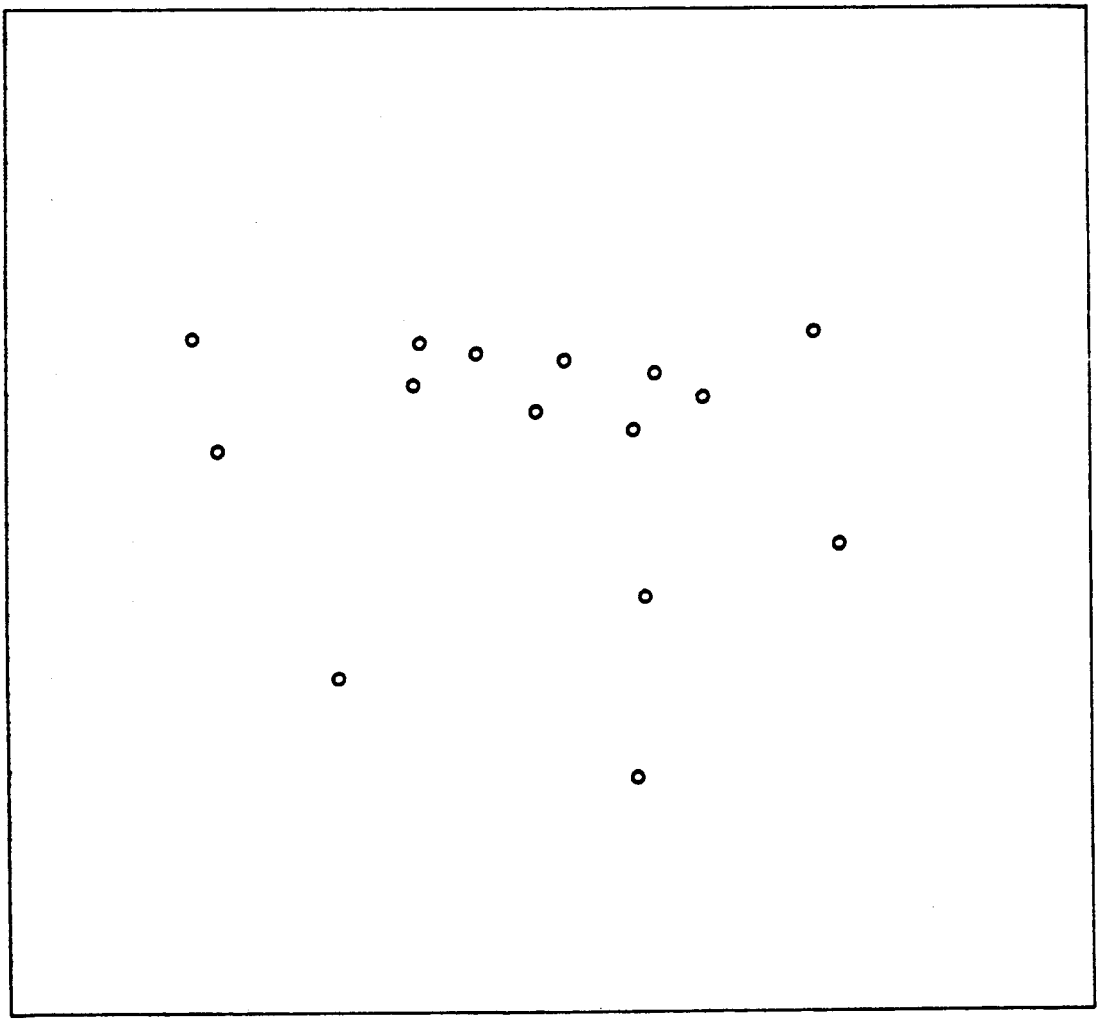
FIGS. 9a, b, c and d show optical flow results of synthetic data for the invention.
Figure 9B:
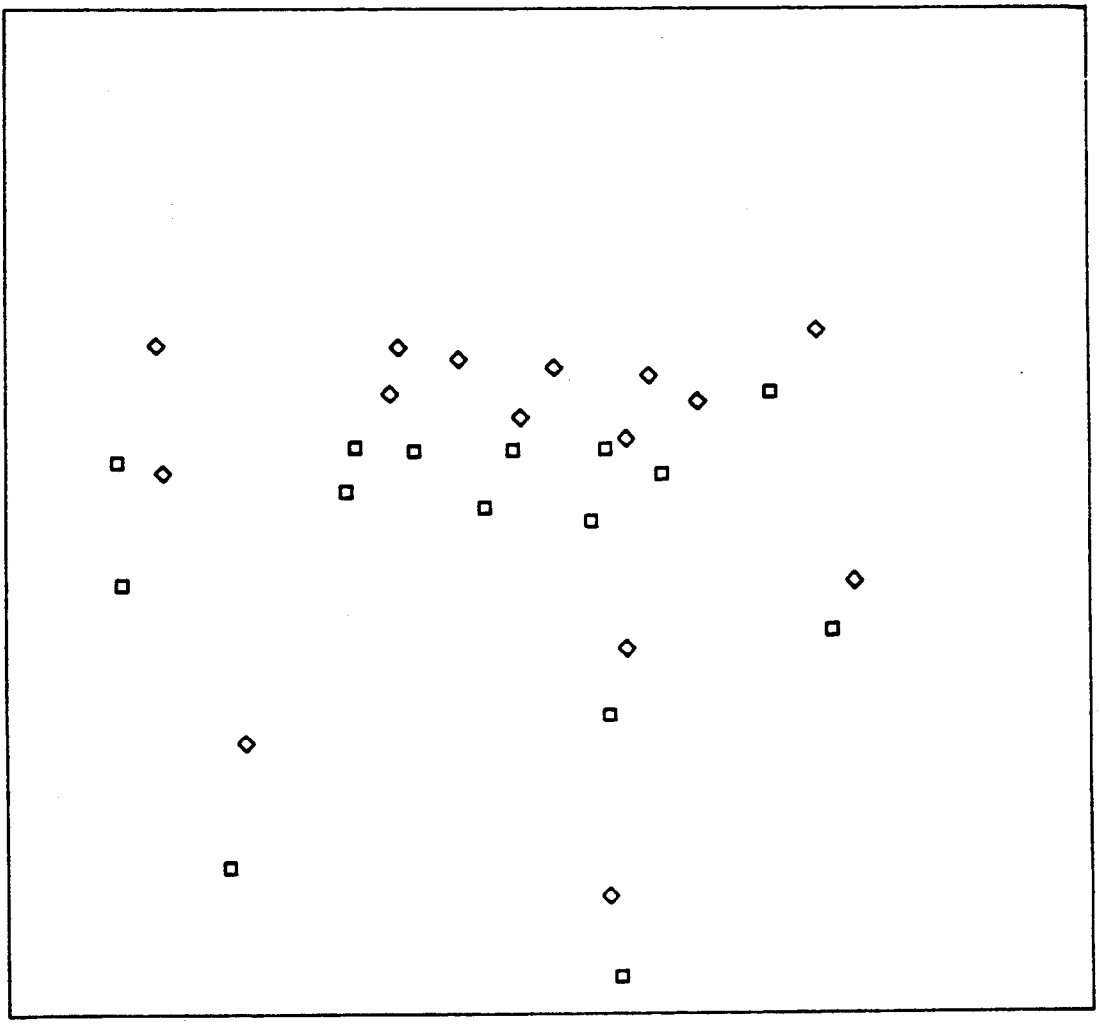
Figure 9C:
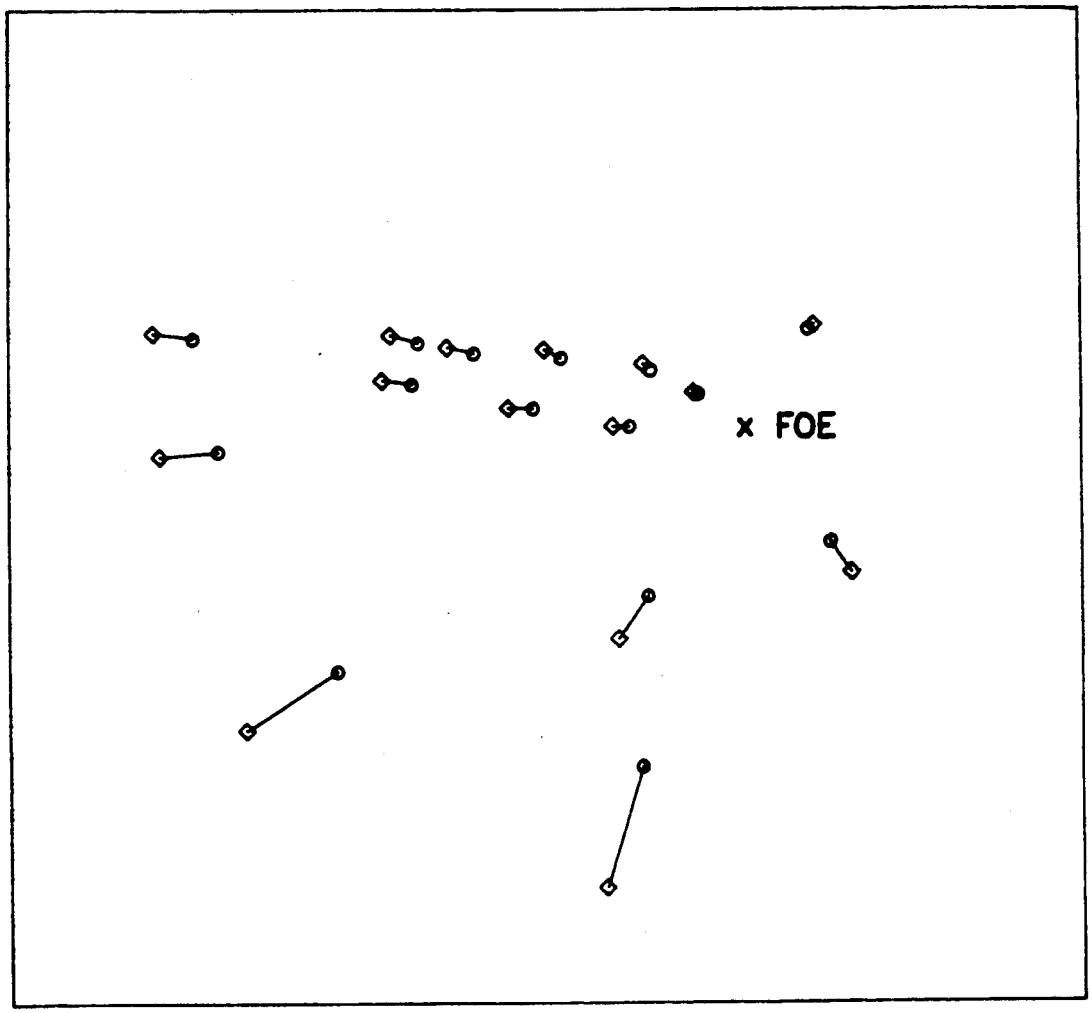
Figure 9D:
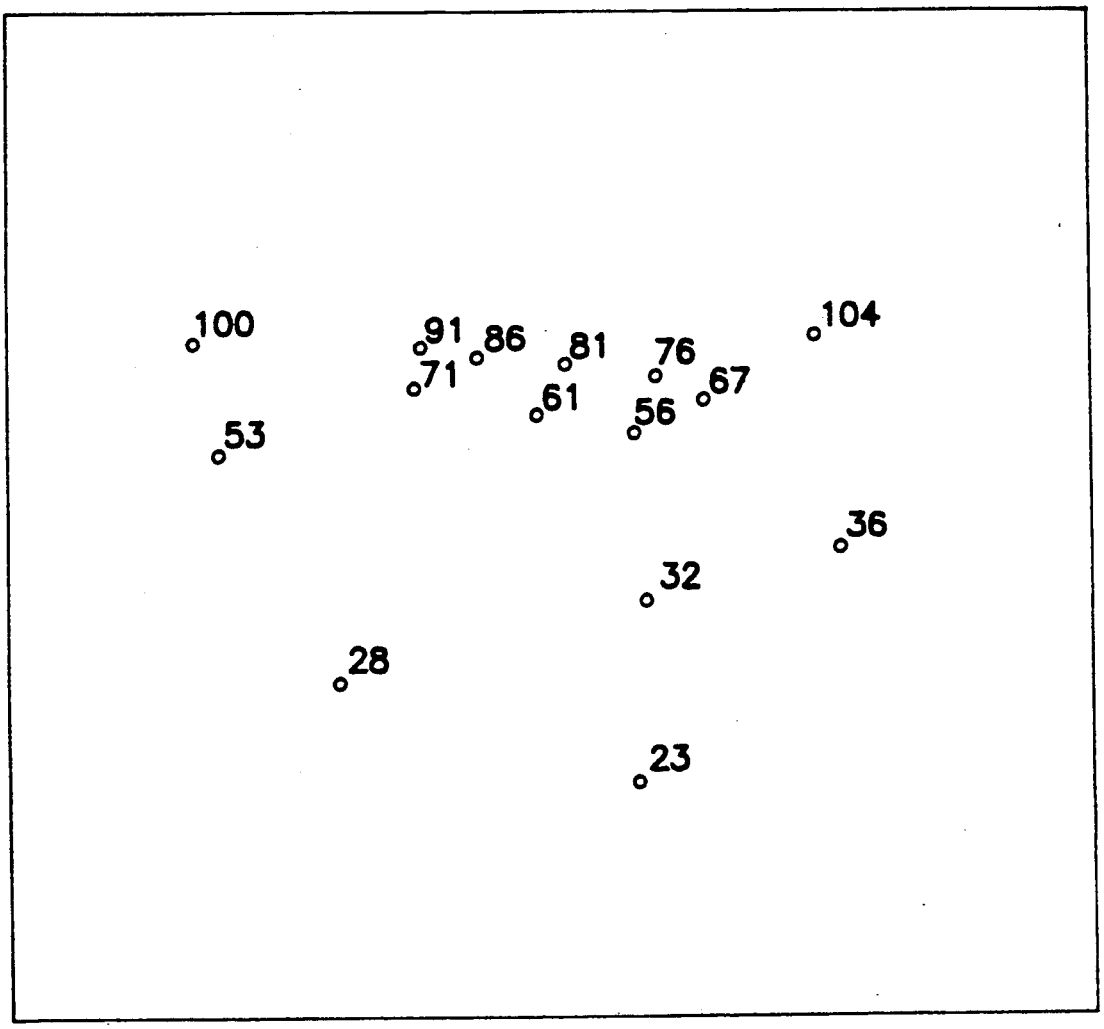

The inertial navigation sensor integrated optical flow method has been used to generate range samples using both synthetic data and real data (imagery and INS information) obtained from a moving vehicle. In the following, results are illustrated using a pair of frames. Synthetic interest points were generated from a file containing the 3-D coordinates of 15 world points. Table 2 shows the 3-D locations of these world points. In the same coordinate system as the interest points are located, table 3 lists the location, roll, pitch, and yaw of the camera at the two instances of time at which synthetic frames A and B were acquired. The time between frame acquisition is 0.2 seconds. FIGS. 9a, b, c and d show optical flow results of sythetic data. FIG. 9a indicates the locations (circles) of the projection of the world (or interest) points onto the first location (i.e., first image) of the image plane where the field of view of the synthesized camera model is 52.0 degrees×48.75 degrees with a focal length of 9 mm. FIG. 9b shows the locations (squares) of the projections of the world (or interest) points onto the second location (i.e., second image) of the image plane and shows the new locations (diamonds) of those projections after derotation. FIG. 9c shows the results of the matching process in which circles are connected to their corresponding diamond with a straight line and the FOE is labeled and marked with an X. In other words, the matching process results in displacement vectors between the circles and the diamonds. The final frame, FIG. 9d, shows the computed range value to each point resulting from each of the matches.

Figure 10A:
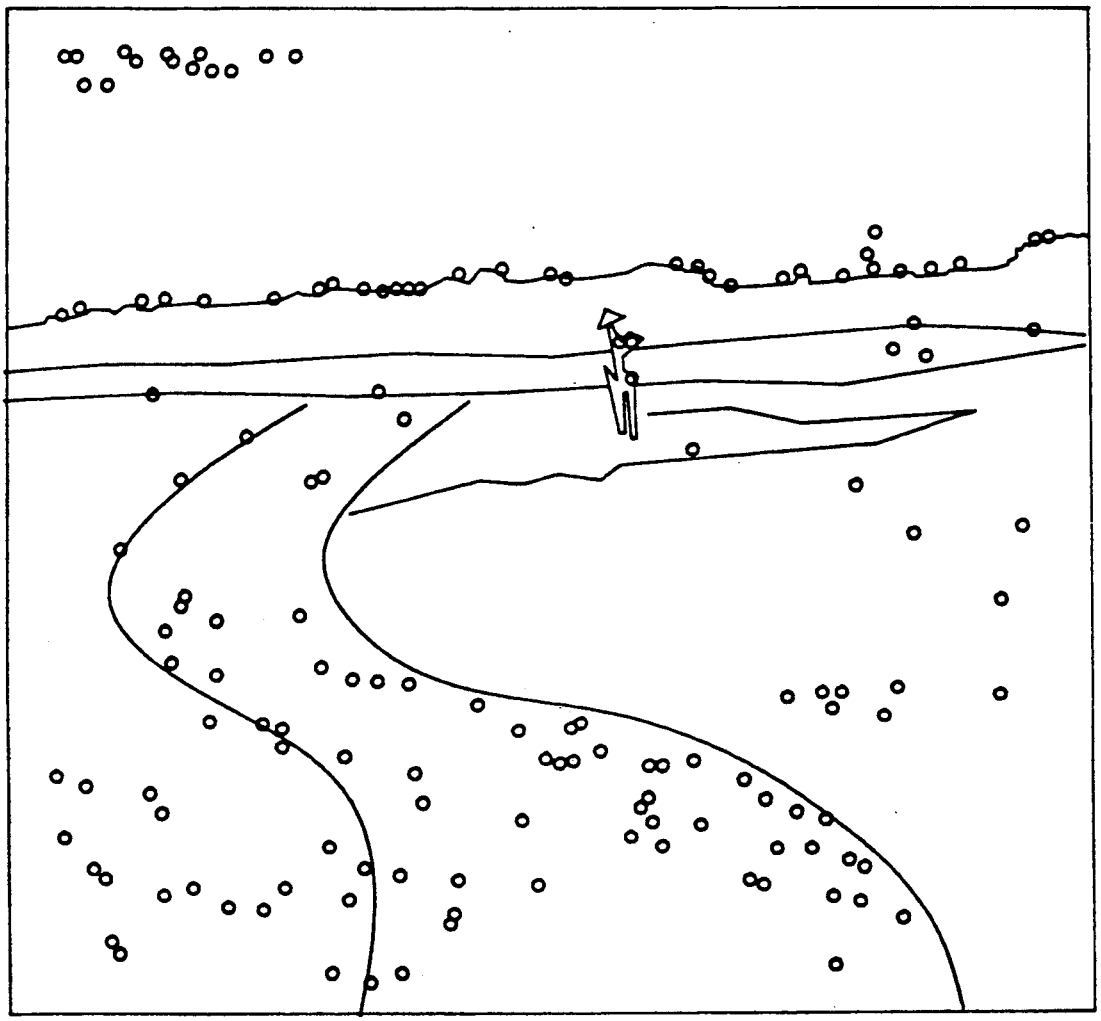
FIGS. 10a, b, c and d show optical flow results using real data for the invention.
Figure 10B:
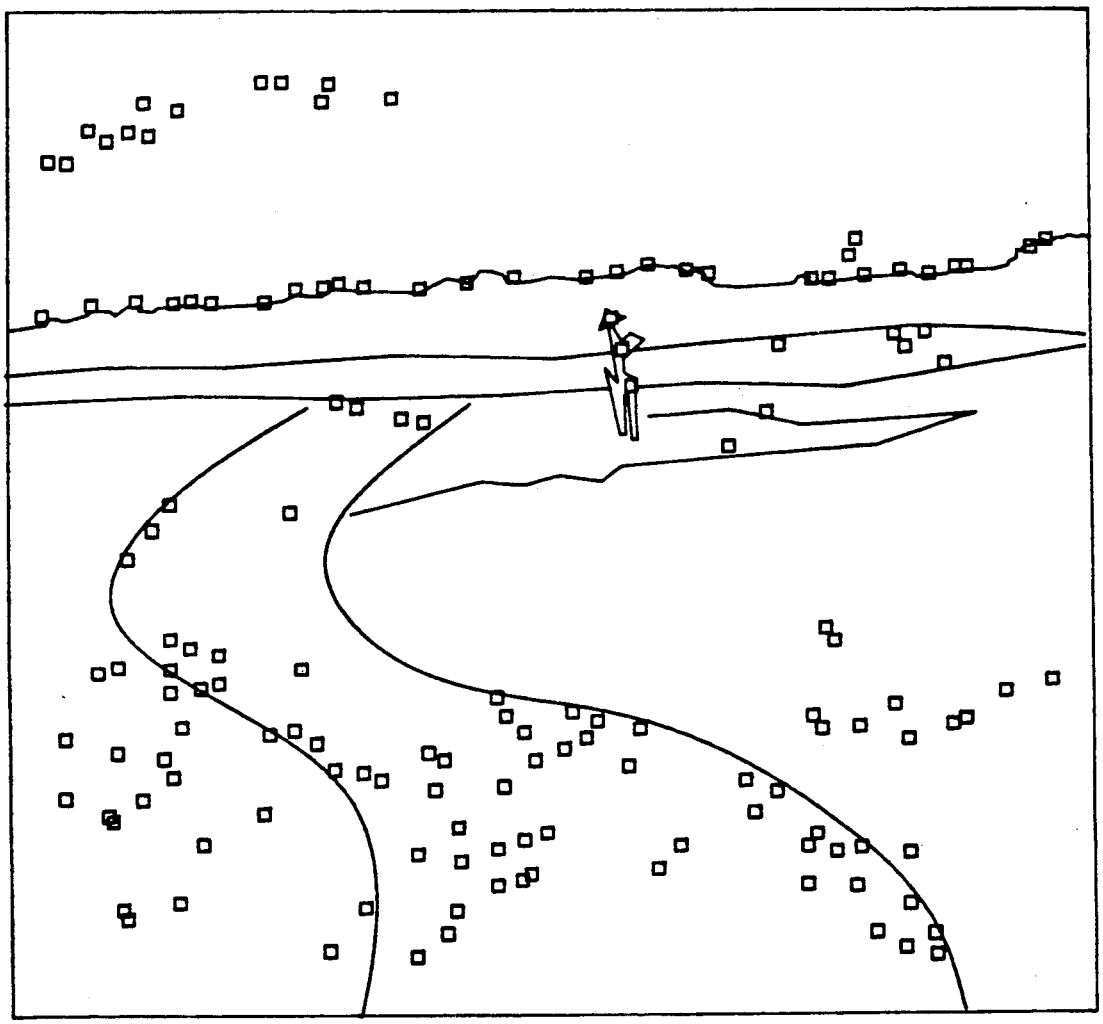
Figure 10C:
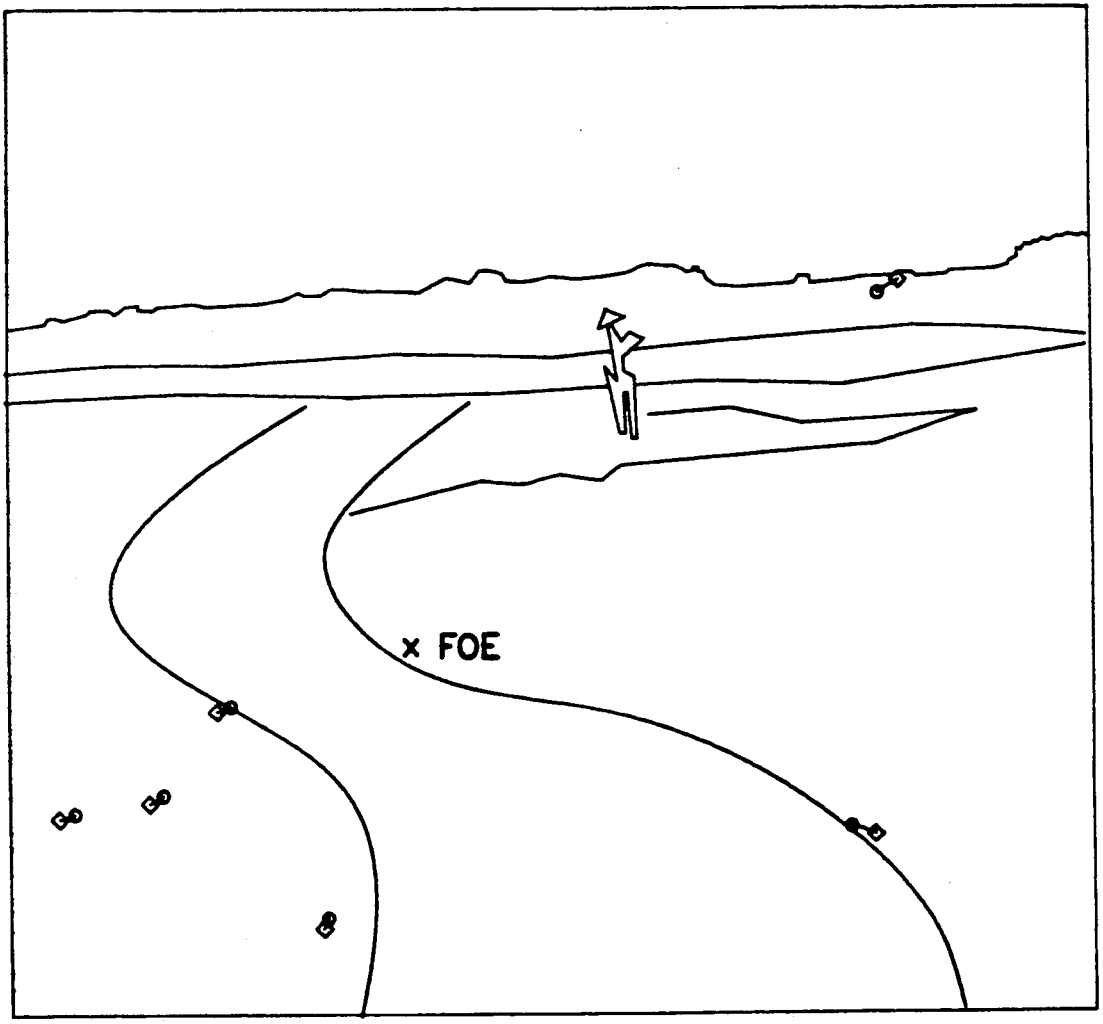
Figure 10D:
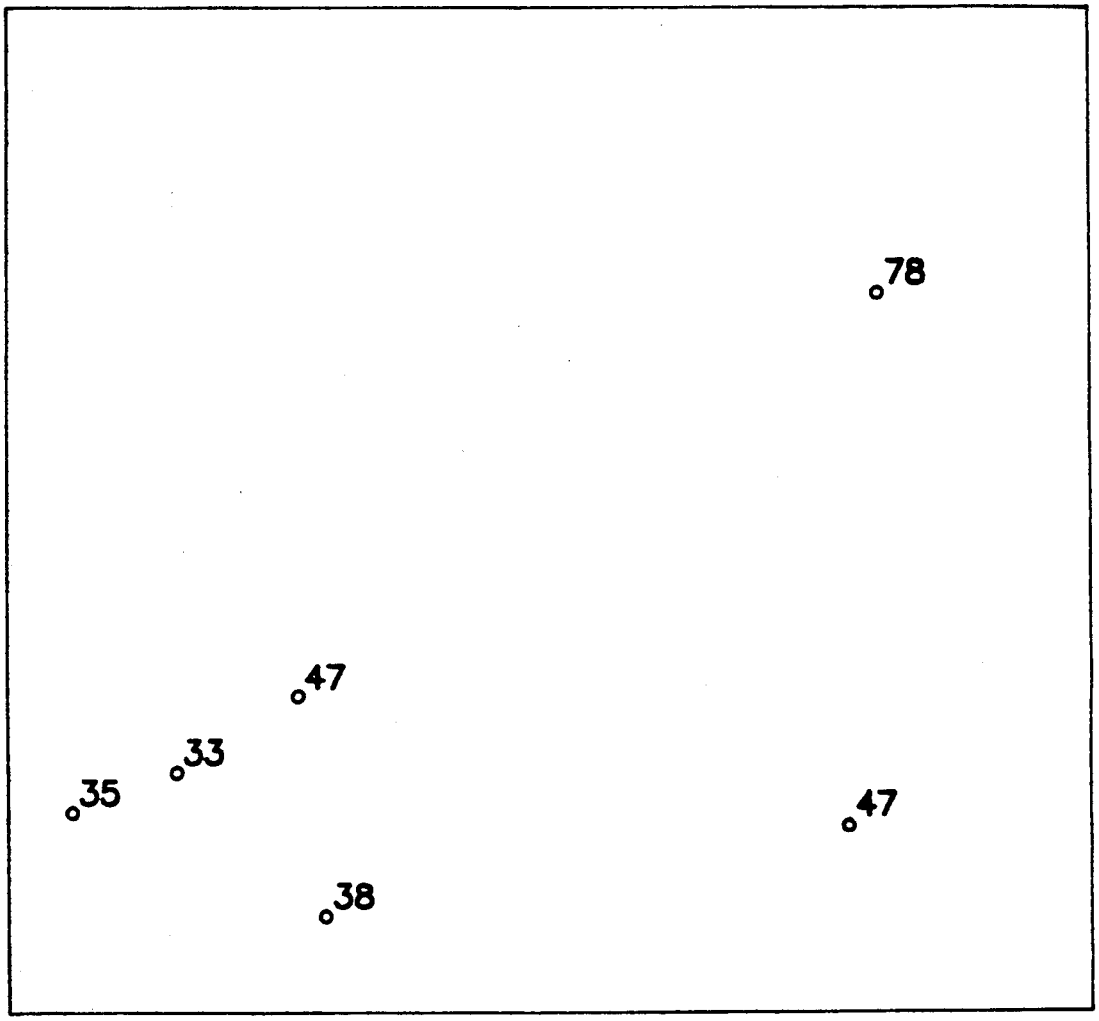

A pair of real images was selected to test the capabilities of the optical flow method using real imagery. Table 4 indicates the location, roll, pitch, and yaw of the camera associated with the pair of real image frames that were used. The field of view of the camera for the real images is 52.1 degrees×40.3 degrees and the focal length=9 mm. The elapsed time between the two frames for this experiment was 0.2 seconds. FIGS. 10a, b, c and d reveal optical flow results using real data. FIG. 10a shows the locations of the extracted interest points obtained from the first frame, drawn as circles. Similarly, FIG. 10b indicates the location of extracted interest points (squares) and the corresponding derotated interest point locations (diamonds). Since the vehicle undergoes very little rotation between frames, the derotated locations are nearly coincident with the original point locations. The results (i.e., displacement vectors between circles and diamonds) of the point matching process for the real imagery, with the FOE indicated by an X, is shown in FIG. 10c. Finally, the computed range value to each of the matched points is displayed in FIG. 10d.

Figure 11:
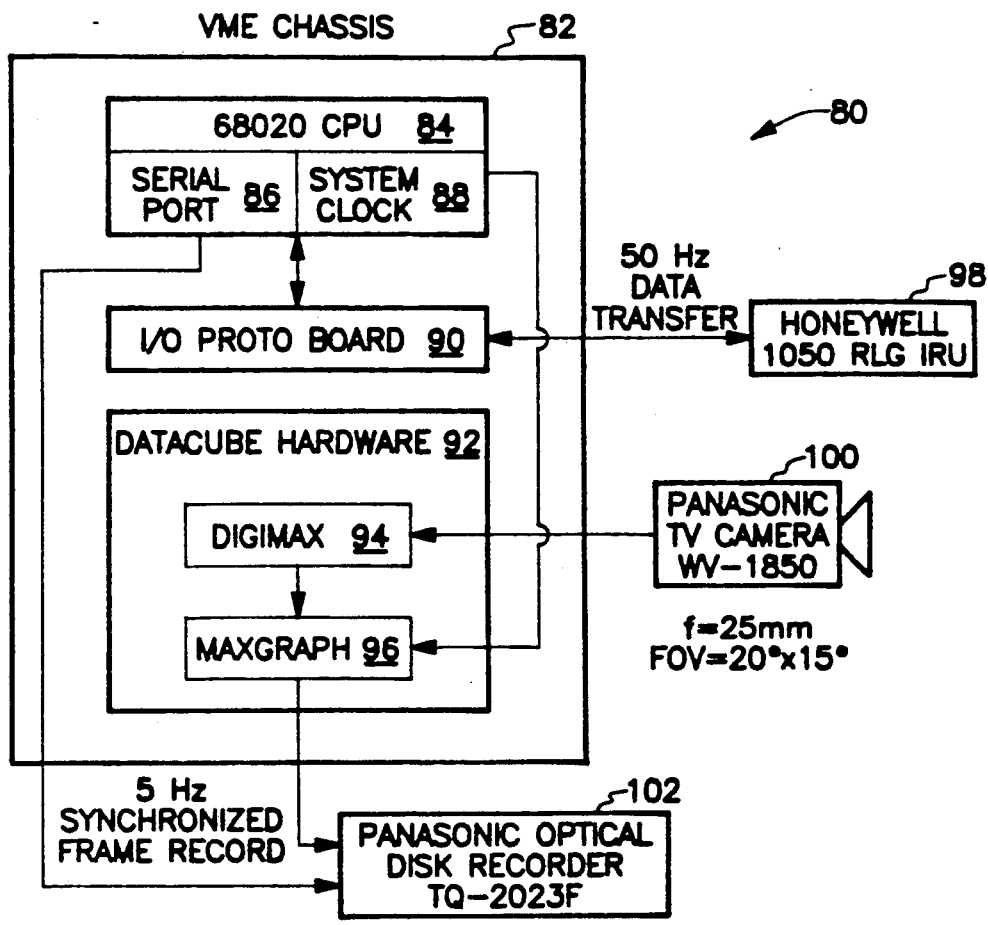
FIG. 11 reveals the hardware system for data collection for the invention.
Figure 12:
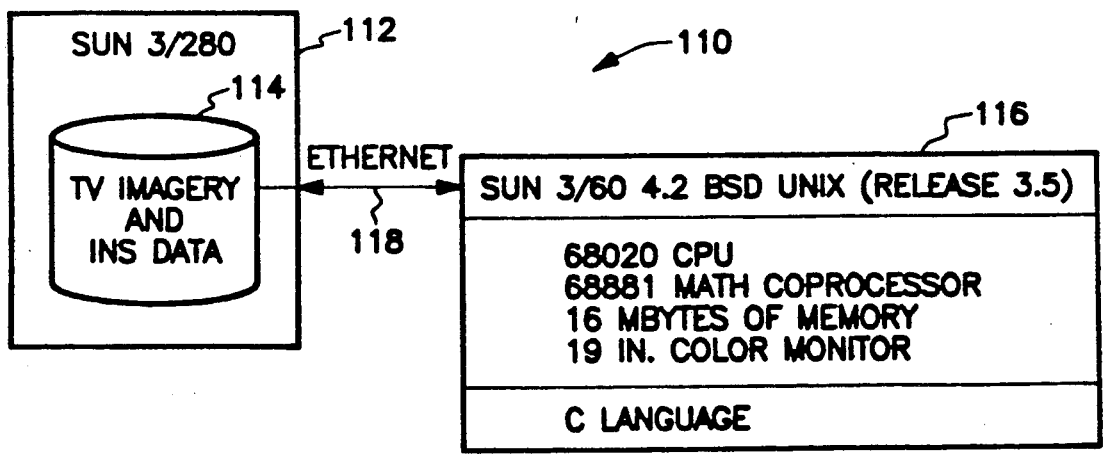
FIG. 12 reveals a computer implementation of the invention.

FIGS. 11 and 12 show the hardware system used for data collection by a ground vehicle and the ODIN system implementation. FIG. 11 is a diagram of hardware system 80 for data collection for the motion field of view for obstacle detection system 10 of FIG. 1. VME chassis 82 (VME is an international standard bus) comprises central processing unit (CPU) 84 (model 68020) having serial port 86 and system clock 88 connected to CPU 84, an input/output proto board 90 connected to serial port 86 and system clock 88 of CPU 84, and DataCube (Boston, MA) hardware 92 that includes Digimax board 94 and MaxGraph board 96 which is connected to system clock 88. A Honeywell model 1050 ring laser gyroscope (RLG) inertial reference unit (IRU) is connected to I/0 board 90 and provides inertial data with time stamping, which is collected at 50 Hz. Sensor 100, which is a Panasonic television camera, model WV-1850, having a focal length of 25 mm and an FOV of 20 degrees by 15 degrees, is connected to board 96 and provides imagery data. Output from chassis 82 goes to Panasonic optical disk recorder 102, model TQ-2023F. Recorder 102 is connected to serial port 86 and board 96. Video frames to recorder 102 have a time stamp and are recorded at 5 Hz sychronously with IRU data from inertial unit 98 to chassis 82. The data in recorder 102 are for optical flow unit 18 of FIG. 1.

FIG. 12 is hardware implementation 110 of obstacle detection system 10 of FIG. 1. Computer 112 (model Sun 3/280) receives television imagery and INS data. Data in recorder 102 of FIG. 11 go to disk 114 of computer 112. Data are in the form of 500×480 pixel images sampled at a 5 Hz rate. The INS data from unit 98 (from Honeywell 1050 RLG inertial measurement unit (IMU)) are in terms of latitude and longitude. The parameters are: $\vec{a}=(a_x, a_y, a_z)$ ft / s² (50 Hz); $\vec{v}=(v_x, v_y, v_z)$ ft / s(20 Hz); and $\vec{w}=(\omega, \phi, \theta)$ degrees (20 Hz), wherein $\phi$ is yaw, $\theta$ is pitch, and $\psi$ is roll.

Computer 12 is connected to computer 116 (model Sun 3/60) via ethernet 118. Computer 116 has a CPU, a math coprocessor and associated memory. It operates in C language in 4.2 BSD Unix (release 3.5) software. Computer 116 performs functions of system 10, particularly, units 18, 20, 24 and 28 of FIG. 1.

We claim:

1. Inertial navigation sensor integrated optical system comprising:
    a scene analysis unit for receiving screen imagery from sensors, and identifying and segmenting features of said imagery;
    an integrated inertial navigation unit for detecting rotational and translational movements of a vehicle; and
    an inertial sensor integrated optical flow unit connected to said integrated navigation unit for tracking the features of the scene imagery based on said rotation and translational movements of said vehicle, and to said scene analysis unit, for creating a map based on said scene imagery wherein range values to obstacles are calculated and alternate routes around the obstacles can be determined.

2. The apparatus of claim 1 further comprising;
    at least one passive sensor connected to said screen analysis unit, for receiving reflected radiation from obstacles within the field of view of said passive sensor;
    a selector unit connected to sad scene analysis unit and to said integrated inertial navigation unit for optionally providing active scanning wherein radiation is emitted from at least one active sensor and reflected off the obstacles, optionally providing passive scanning in the form of binocular and motion stereo, and optionally providing variable fields-of-view of a scene, wherein one of the obstacles can be detected and an alternate path to avoid the obstacle can be found with a selective aid of said active scanning, said passive scanning, and said variable fields-of-view of the scene; and
    a range interpolation unit which computes approximate range values to portions of the obstacle between interest points extracted from the scene imagery of the obstacles, wherein the distances to the interest points are known.

3. The apparatus of claim 2 wherein said scene analysis unit comprises:
    a context dependent image characterization unit connected to said passive sensor, to said integrated inertial navigation unit, to said inertial sensor integrated optical flow unit, and to said selector unit, for receiving said imagery from said passive sensor and identifying and segmenting said imagery into identifiable features of the scene within the field of view of said passive and active sensors;
    a range predictor and smoother unit connected to said inertial integrated optical flow unit and to said integrated inertial navigation unit, utilizing frames of said imagery for determining locations of the interest points on the frames of said imagery; and a qualitative scene model and range calculation unit connected to said inertial sensor integrated optical flow unit, to said range interpolation unit, to said range predictor and smoother unit, to said context dependent image characterization unit, and to said selector unit, for combining range calculations to the interest points with the locations of the interest points on the frames of said imagery.

4. The apparatus of claim 3 wherein said inertial sensor integrated optical flow unit comprises:

a first interest point extractor, connected to said scene analysis unit, for extracting interest points from a first frame of said imagery;

a second interest point extractor, connected to said scene analysis unit, for extracting interest points from a second frame of said imagery;

an interest point derotation unit connected to said second interest point extractor unit and to said integrated inertial navigation unit, for determining said translational movements of the vehicle between the said first and second frames of said imagery;

a focus of expansion computational unit connected to said integrated inertial navigational unit, for calculating the location of a common focus of expansion for the first and second frames of said imagery;

an interest point matching unit connected to said first interest point extractor, to said interest point derotation unit, to said integrated inertial navigational unit, and to said focus of expansion computational unit, for matching the common interest points which are extracted in the first frame of said imagery and the second frame of said imagery; and a range to matched interest points measurement unit connected to said interest point matching unit, to said integrated inertial navigation unit, and to said range interpolation unit, for calculating the distance from the vehicle to some feature of the obstacle from which interest points were extracted.

* * * * *

UNITED STATES PATENT AND TRADEMARK OFFICE
CERTIFICATE OF CORRECTION

PATENT NO. : 5,128,874
DATED : July 7, 1992
INVENTOR(S) : Bir Bhanu et al.

It is certified that error appears in the above-identified patent and that said Letters Patent is hereby corrected as shown below:

Column 14, line 32, delete "screen" and insert --scene--.

Column 14, line 36, delete "sad" and insert --said--.

Signed and Sealed this

Fifth Day of October, 1993

*Attest:*

BRUCE LEHMAN

*Attesting Officer*     *Commissioner of Patents and Trademarks*